(12) United States Patent
Mugunda et al.

(10) Patent No.: US 11,842,186 B2
(45) Date of Patent: Dec. 12, 2023

(54) FIRMWARE UPDATE SYSTEM

(71) Applicant: Dell Products L.P., Round Rock, TX (US)

(72) Inventors: Chandrasekhar Mugunda, Austin, TX (US); Yogesh Prabhakar Kulkarni, Round Rock, TX (US); Akshata Sheshagiri Naik, Leander, TX (US); Rui An, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 51 days.

(21) Appl. No.: 17/344,292

(22) Filed: Jun. 10, 2021

(65) Prior Publication Data

US 2022/0398091 A1 Dec. 15, 2022

(51) Int. Cl.
*G06F 8/654* (2018.01)
(52) U.S. Cl.
CPC .................... *G06F 8/654* (2018.02)
(58) Field of Classification Search
CPC ........ G06F 8/65; G06F 21/78; G06F 12/0246; G06F 8/654; G06F 8/61; G06F 8/66; G06F 8/60
See application file for complete search history.

(56) References Cited

U.S. PATENT DOCUMENTS

| 6,564,317 | B1* | 5/2003 | Hale | G06F 9/24 712/E9.007 |
| 8,713,559 | B2 | 4/2014 | Fallon et al. | |
| 8,996,744 | B1* | 3/2015 | Marr | G06F 8/65 713/193 |
| 10,678,529 | B1* | 6/2020 | Farhan | G06F 8/65 |
| 2006/0143600 | A1* | 6/2006 | Cottrell | G06F 21/572 717/168 |
| 2006/0190532 | A1* | 8/2006 | Chadalavada | H04L 63/10 709/203 |
| 2014/0101653 | A1* | 4/2014 | Dharmadhikari | G06F 8/65 717/173 |
| 2014/0208133 | A1* | 7/2014 | Gopal | G06F 11/2294 713/310 |
| 2017/0206034 | A1* | 7/2017 | Fetik | G06F 8/61 |
| 2019/0095623 | A1* | 3/2019 | Narasimhan | G06F 21/572 |

(Continued)

*Primary Examiner* — Wei Y Zhen
*Assistant Examiner* — Brahim Bourzik
(74) *Attorney, Agent, or Firm* — Joseph Mencher (57) ABSTRACT

A firmware update system includes firmware storage device(s), an operating system engine coupled to the firmware storage device(s), and a remote access controller device coupled to the firmware storage device(s) and the operating system engine. The remote access controller device receives a single out-of-band firmware update command and, in response, performs a firmware storage device unlock operation to unlock the firmware storage device(s), transmits a firmware update package including a firmware update utility and a firmware update image to the operating system engine to cause the operating system engine to utilize the firmware update utility to update firmware stored in the firmware storage device(s) that was unlocked with the firmware update image and, subsequent to the operating system engine updating the firmware stored in the at least one firmware storage device that was unlocked, performs a firmware storage device lock operation to lock the firmware storage device(s).

20 Claims, 10 Drawing Sheets

(56) References Cited

U.S. PATENT DOCUMENTS

| | | | |
|---|---|---|---|
| 2020/0314123 A1* | 10/2020 | Staab | G06F 21/78 |
| 2021/0173632 A1* | 6/2021 | Hsu | G06F 8/654 |
| 2022/0172538 A1* | 6/2022 | De Marcillac | G06F 21/31 |
| 2023/0169808 A1* | 6/2023 | Imanuel | G06F 8/65 |
| | | | 340/5.61 |

* cited by examiner

FIRMWARE UPDATE SYSTEM

BACKGROUND

The present disclosure relates generally to information handling systems, and more particularly to updating firmware in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server systems like the DELL EMC® POWEREDGE® XE7100 or the DELL EMC® POWEREDGE® XE8545 available from DELL EMC® of Hopkinton, Massachusetts, United States and Round Rock, Texas, United States, may include a processing system having one or more processors (e.g., Graphics Processing Units (GPUs)) that utilize processor firmware (e.g., GPU firmware/vBIOS) in their operation. In such server systems, the processor firmware is hosted by firmware storage devices that are included as part of a firmware storage system and provided by, for example, Electronically Eraseable Programmable Read Only Memory (EEPROM) devices, Serial Peripheral Interface (SPI) flash memory devices, and/or other firmware storage devices known in the art. Some processor manufacturers provide a processor firmware update utility whose functionality is enabled via in-band commands to an operating system in the server system that cause that operating system to utilize the processor firmware update utility to update the processor firmware in the firmware storage device(s) discussed above, while also providing enhanced server system security via the ability to enable write-protection in the firmware storage devices in the firmware storage system. For example, NVIDIA® corporation of Santa Clara, California, United States manufactures GPUs and provides a GPU firmware utility whose functionality is enabled via in-band commands to an operating system in the server system that cause that operating system to utilize the GPU firmware update utility to update GPU firmware that is hosted in SPI flash memory device(s), while also providing write protection capability in the SPI flash memory device(s).

However, server systems like those discussed above (e.g., the DELL EMC® POWEREDGE® XE7100 or the DELL EMC® POWEREDGE® XE8545) require the provisioning of out-of-band commands to a remote access controller/Baseboard Management Controller (BMC) (e.g., the integrated DELL® Remote Access Controller (iDRAC) provided in server systems available from DELL® Inc.) in order to enable and disable write protection (e.g., via System Management Bus Post Box Interface (SMBPBI) commands transmitted by the remote access controller/BMC). As such, conventional processor firmware updates in server systems like those discussed above require an administrator of the server system to provide a first out-of-band command via a remote access controller/BMC management interface to the remote access controller/BMC to disable write protection for the firmware storage device(s) (e.g., the SPI flash memory devices) in the firmware storage system, then provide an in-band command via an operating system management interface to the operating system to utilize the processor firmware update utility (e.g., the GPU firmware update utility) to update the processor firmware (e.g., the GPU firmware) in the firmware storage device(s) (e.g., the SPI flash memory) in the firmware storage system, and then provide a second out-of-band command via the remote access controller/BMC management interface to the remote access controller/BMC to enable write protection to the firmware storage device(s) (e.g., the SPI flash memory) in the firmware storage system. In other words, conventional processor firmware updates require an administrator to switch back and forth between out-of-band and in-band management interfaces and commands to compete the processor firmware update process, which can result in processor firmware update process failures due to asynchronous errors, as well as other issues that would be apparent to one of skill in the art in possession of the present disclosure.

Accordingly, it would be desirable to provide a firmware update system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a remote access controller engine that is configured to: receive a single out-of-band firmware update command and, in response: perform a firmware storage device unlock operation to unlock at least one firmware storage device; transmit a firmware update package including a firmware update utility and a firmware update image to an operating system engine, wherein the firmware update package is configured to cause the operating system engine to utilize the firmware update utility to update firmware stored in the at least one firmware storage device that was unlocked with the firmware update image; and perform, subsequent to the operating system engine updating the firmware stored in the at least one firmware storage device that was unlocked, a firmware storage device lock operation to lock the at least one firmware storage device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
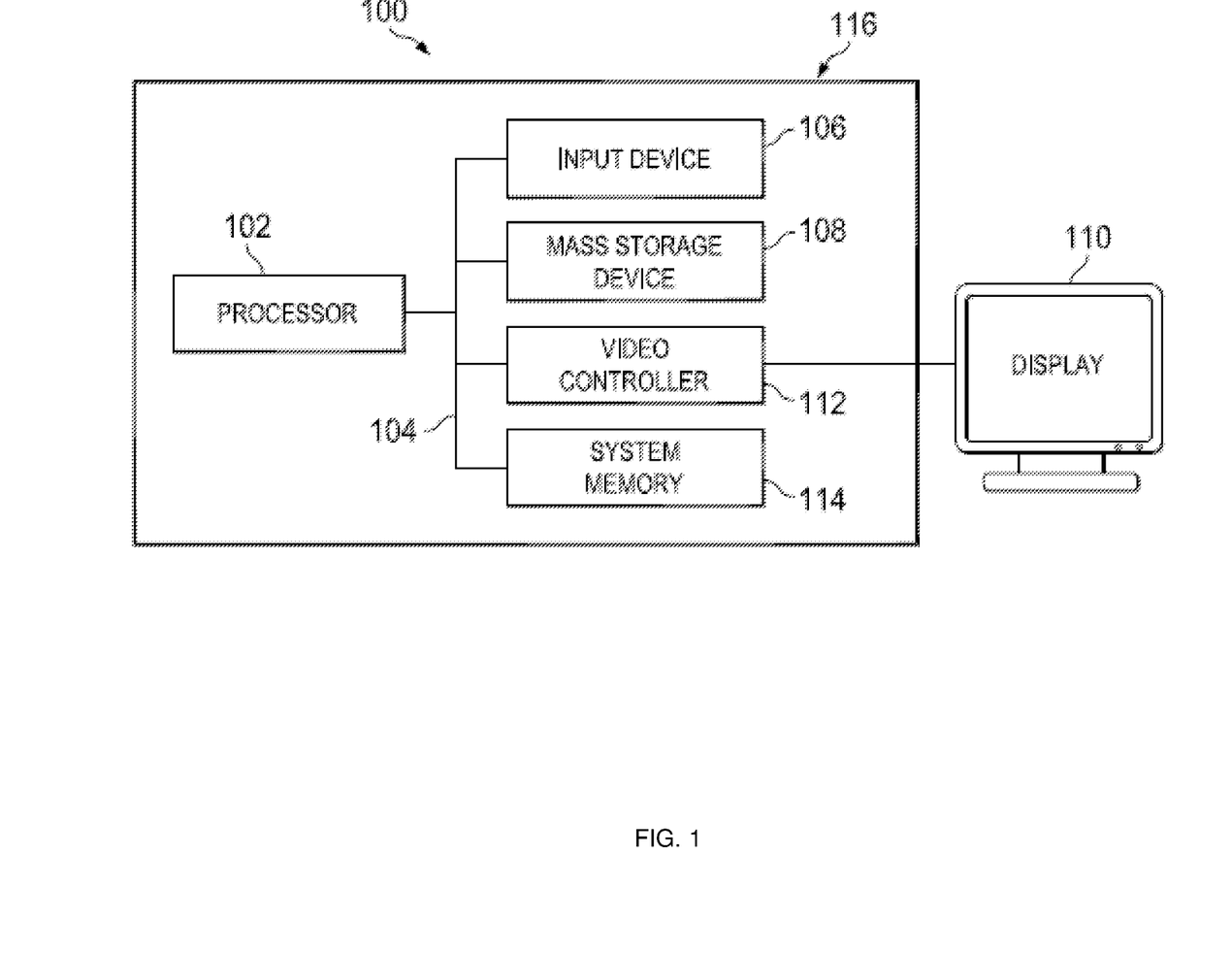
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
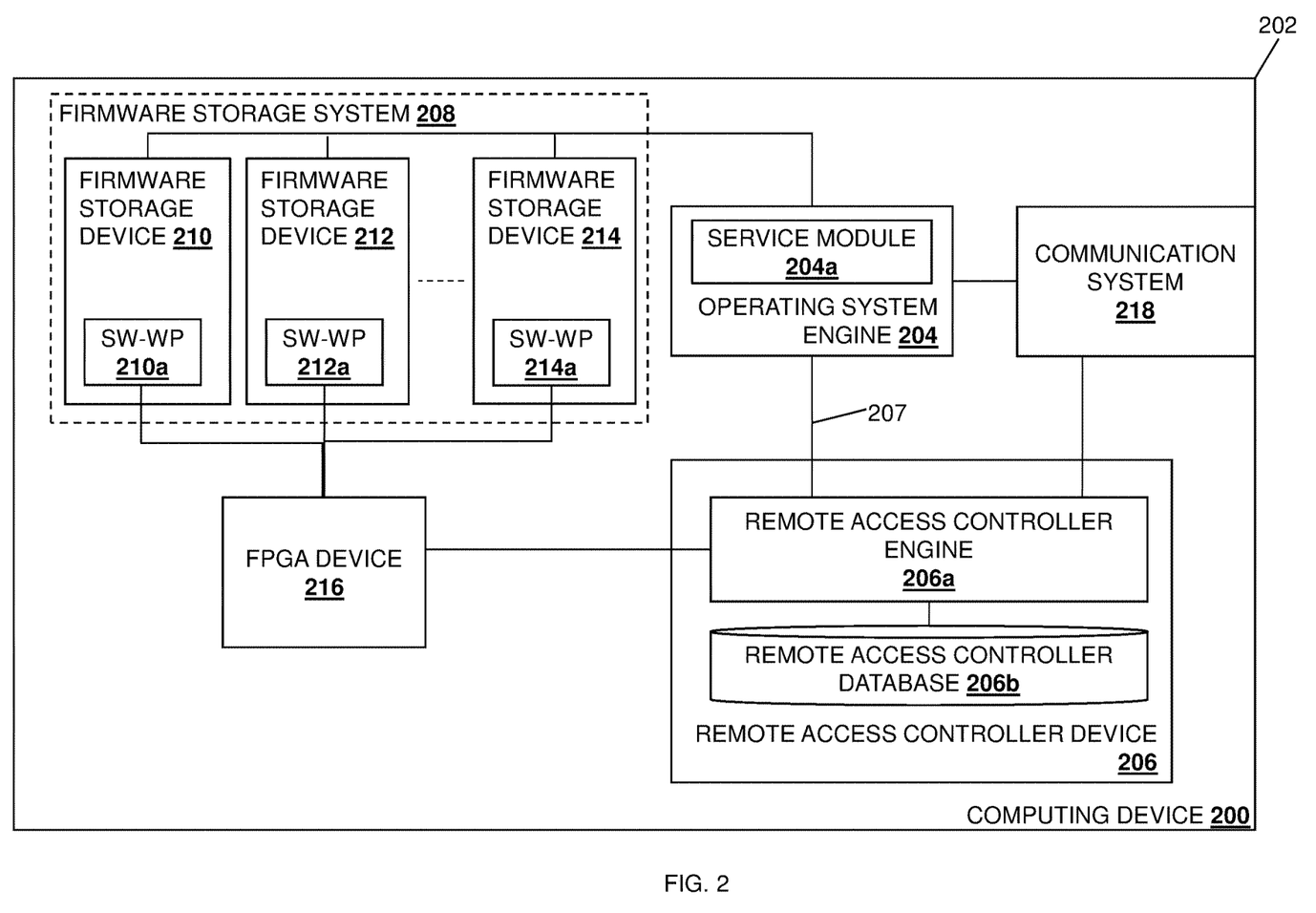
FIG. 2 is a schematic view illustrating an embodiment of a computing device that includes the firmware update system of the present disclosure.

Referring now to FIG. 2, an embodiment of a computing device 200 is illustrated that may utilize the firmware update system of the present disclosure. In an embodiment, the computing device 200 may be provided by the IHS 100 discussed above with reference to FIG. 1 and/or may include some or all of the components of the IHS 100, and in specific examples, may be provided by a server system such as the DELL EMC® POWEREDGE® XE7100 or the DELL EMC® POWEREDGE® XE8545 available from DELL EMC® of Hopkinton, Massachusetts, United States and Round Rock, Texas, United States. However, while illustrated and discussed as being provided by particular server systems, one of skill in the art in possession of the present disclosure will recognize that the functionality of the computing device 200 discussed below may be provided by other devices and/or systems that are configured to operate similarly as discussed below. In the illustrated embodiment, the computing device 200 includes a chassis 202 that houses the components of the computing device 200, only some of which are illustrated below.

For example, the chassis 202 may house a central processing system (not illustrated, but which may include the processor 102 discussed above with reference to FIG. 1 (e.g., a Central Processing Unit (CPU)) and a memory system (not illustrated, but which may include the memory 114 discussed above with reference to FIG. 1) that is coupled to the processing system and that includes instructions that, when executed by the processing system, cause the processing system to provide an operating system engine 204 that is configured to perform the functionality of the operating system engines and/or computing devices discussed below. In the illustrated embodiment, the operating system engine 204 includes a service module 204a. In a specific example in which the computing device 200 includes an integrated DELL® Remote Access Controller (iDRAC) available in server systems provided by DELL® EMC® as discussed above, the service module 204a may be provided by an iDRAC service module (iSM). However, while a specific service module has been described, one of skill in the art in possession of the present disclosure will appreciate that the operating system engine 204 may be enabled with the service module functionality discussed below in a variety of manners that will fall within the scope of the present disclosure as well.

In the illustrated embodiment, the chassis 202 also houses a remote access controller device 206 (e.g., the iDRAC discussed above) that may include a remote access controller processing system (not illustrated, but which may include the processor 102 discussed above with reference to FIG. 1) and a remote access controller memory system (not illustrated, but which may include the memory 114 discussed above with reference to FIG. 1) that is coupled to the remote access controller processing system and that includes instructions that, when executed by the remote access controller processing system, cause the remote access controller processing system to provide remote access controller engine 206a that is configured to perform the functionality of the remote access controller engines and/or remote access controller devices discussed below. The remote access controller device 206 may also include a remote access controller storage device (not illustrated, but which may include the storage 108 discussed above with reference to FIG. 1) that is coupled to the remote access controller engine 206*a* (e.g., via a coupling between the remote access controller storage system and the remote access controller processing system) and that includes a remote access controller database 206*b* that is configured to store any of the information utilized by the remote access controller engine 206*a* discussed below. As illustrated, the remote access controller engine 206*a* may be coupled to the operating system engine 204 via a link 207. In a specific example, the link 207 may be provided by a Universal Serial Bus (USB)/Network Interface Controller (NIC) passthrough interface, although one of skill in the art in possession of the present disclosure will appreciate how other remote access controller device/operating system engine links/couplings will fall within the scope of the present disclosure as well.

The chassis 302 may also house a firmware storage system 208 that includes a plurality of firmware storage devices 210, 212, and up to 214 (any or each of which may be provided by the storage 108 discussed above with reference to FIG. 1). As illustrated each of the firmware storage devices 210-214 may include a software write-protection (SW-WP) element, with the firmware storage device 210 including an SW-WP element 210*a*, the firmware storage device 212 including an SW-WP element 212*a*, and the firmware storage device 214 including an SW-WP element 214*a* in the illustrated embodiment. However, while software write protection elements are illustrated and described below as being utilized to lock and unlock the firmware storage devices 210-214 to prevent and enable, respectively, the updating of firmware stored on those firmware storage devices 210-214, one of skill in the art in possession of the present disclosure will appreciate how other locking/unlocking subsystems/techniques will fall within the scope of the present disclosure as well. As illustrated the operating system engine 204 may be coupled to each of the firmware storage devices 210-214, while the remote access controller engine 206*a* may be coupled to each of the firmware storage devices 210-214 as well via a Field Programmable Gate Array (FPGA) device 216. However, while specific coupling configurations for the operating system engine 204 and the remote access controller device 206 to the firmware storage system 208 are illustrated and discussed below, one of skill in the art in possession of the present disclosure will appreciate how other coupling configurations for the operating system engine 204 and the remote access controller device 206 to the firmware storage system 208 will fall within the scope of the present disclosure as well.

The chassis 202 may also house a communication system 218 that is coupled to the operating system engine 204 (e.g., via a coupling between the communication system 218 and the central processing system) and the remote access controller engine 206*a* in the remote access controller device 206 (e.g., via a coupling between the communication system 218 and the remote access controller processing system), and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure. As discussed in further detail below, the communication system 218 may be configured to enable "in-band" communications to the operating system engine 204 (e.g., via a "data network" coupled to the communication system 218), and may enable "out-of-band" communications to the remote access controller engine 206*a* in the remote access controller device 206 (e.g., via a "management network" coupled to the communication system 218). However, while a specific computing device 200 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device (e.g., server system) functionality, as well as the functionality discussed below, while remaining within the scope of the present disclosure as well.

Figure 3:
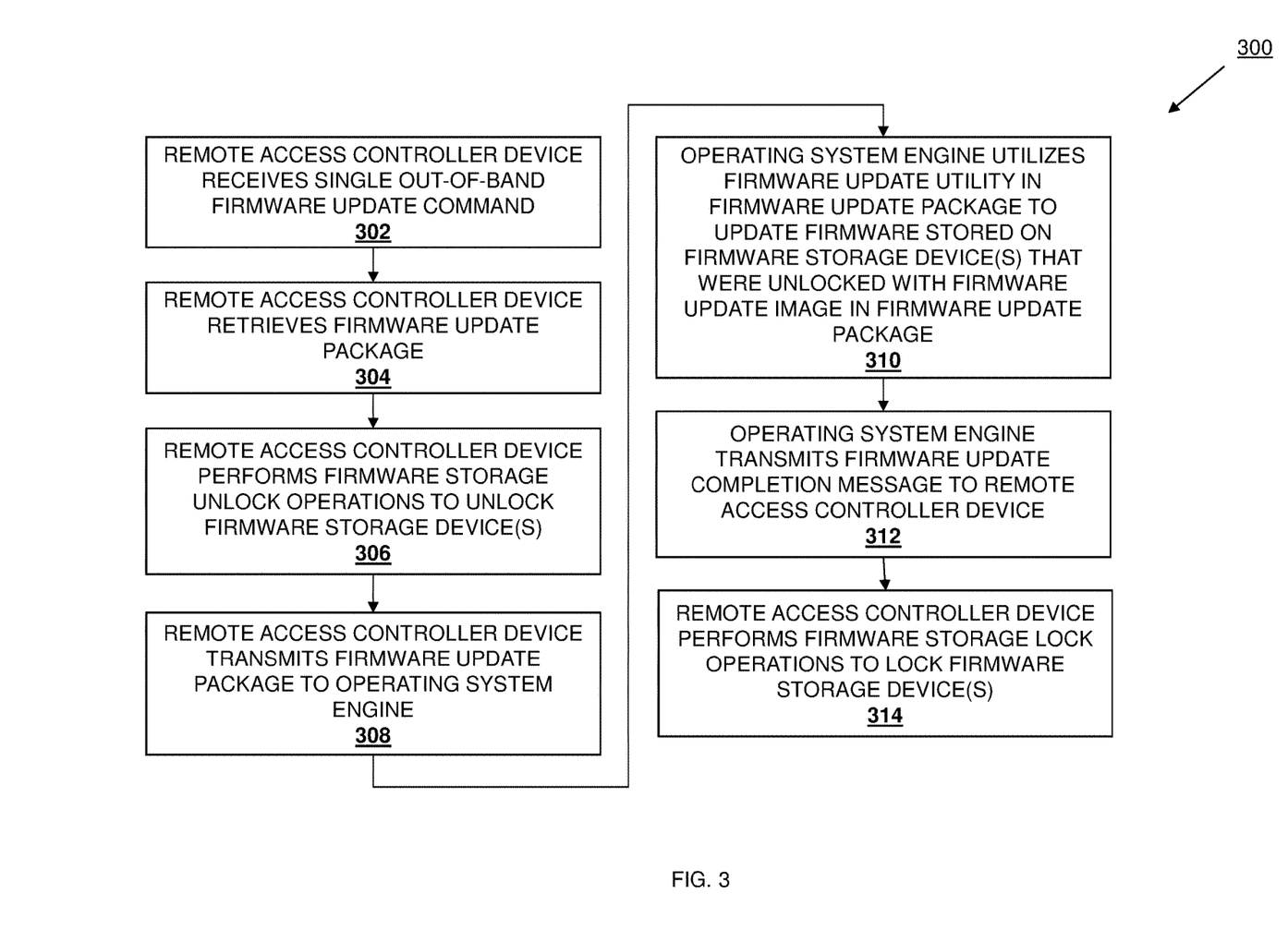
FIG. 3 is a flow chart illustrating an embodiment of a method for updating firmware.

Referring now to FIG. 3, an embodiment of a method 300 for updating firmware is illustrated. As discussed below, the systems and methods of the present disclosure provide for the updating of firmware that is stored in a lockable firmware storage system via a single firmware update command from an administrator or other user of the computing device 200. For example, the firmware update system of the present disclosure may include firmware storage device(s), an operating system engine coupled to the firmware storage device(s), and a remote access controller device coupled to the firmware storage device(s) and the operating system engine. The remote access controller device receives a single out-of-band firmware update command and, in response, performs a firmware storage device unlock operation to unlock the firmware storage device(s), transmits a firmware update package including a firmware update utility and a firmware update image to the operating system engine to cause the operating system engine to utilize the firmware update utility to update firmware stored in the firmware storage device(s) that was unlocked with the firmware update image and, subsequent to the operating system engine updating the firmware stored in the at least one firmware storage device that was unlocked, performs a firmware storage device lock operation to lock the firmware storage device(s). As such, the need in conventional firmware update systems to switch between different management interfaces multiple times to update firmware is eliminated, streamlining the firmware update process for the administrator of the computing device via synchronized remote access controller device/operating system engine functionality.

Figure 4A:
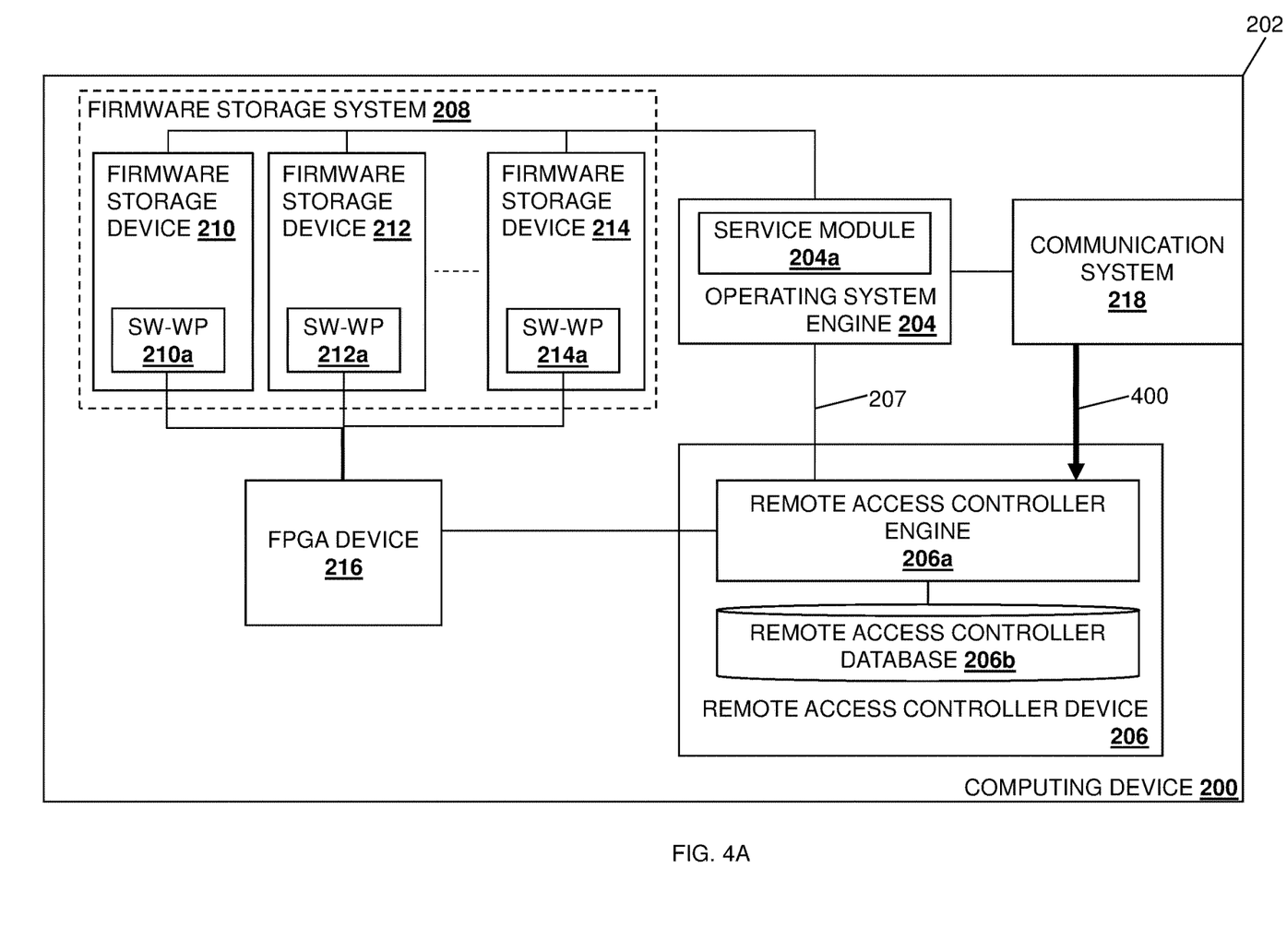
FIG. 4A is a schematic view illustrating an embodiment of the computing device operating during the method of FIG. 3.

The method 300 begins at block 302 where a remote access controller device receives a single out-of-band firmware update command. With reference to FIG. 4A, in an embodiment of block 302, the remote access controller engine 206*a* in the remote access controller device 206 may perform out-of-band firmware update command receiving operations 400 that include receiving an out-of-band firmware update command via the communication system 218. As will be appreciated by one of skill in the art in possession of the present disclosure, the remote access controller device 206 (e.g., the iDRAC® discussed above) may be connected via the communication system 218 to an out-of-band management network through which an administrator of the computing device 200 may transmit out-of-band firmware update commands via a management interface on a management device that is coupled to the out-of-band management network. As such, at block 302, the administrator of the computing device 200 may initiate a firmware update process by generating and transmitting the single out-of-band firmware update command via the out-of-band network to the remote access controller engine 206*a* in the remote access controller device 206 and, as discussed in further detail below, the firmware update system of the present disclosure will then complete the firmware update process based only on that single firmware update command and without the need for any subsequent commands from the administrator of the computing device 200.

In the specific examples provided below, the firmware updates performed by the firmware update system of the present disclosure are GPU firmware updates for GPU firmware (e.g., updates to GPU firmware/vBIOS for one on or more GPUs in a GPU system included in the computing device 200) that is hosted by one or more of the firmware storage devices 210-214 in the firmware storage system 208. However, while particular firmware for particular components is described herein, one of skill in the art in possession of the present disclosure will recognize how other firmware for other components may benefit from the teachings of the present disclosure and thus will fall within its scope as well. In some examples, the remote access controller engine 206a in the remote access controller device 206 may notify the administrator of the computing device 200 that a firmware update is available so that the administrator may transmit the out-of-band firmware update command at block 302, but one of skill in the art in possession of the present disclosure will recognize that the administrator of the computing device 200 may transmit the out-of-band firmware update command at block 302 without being prompted while remaining within the scope of the present disclosure as well. Furthermore, in yet other embodiments, the single out-of-band firmware update command may be provided to the remote access controller engine 206a in the remote access controller device 206 based on automation processes (e.g., scheduled firmware updates) while remaining within the scope of the present disclosure as well.

Figure 4B:
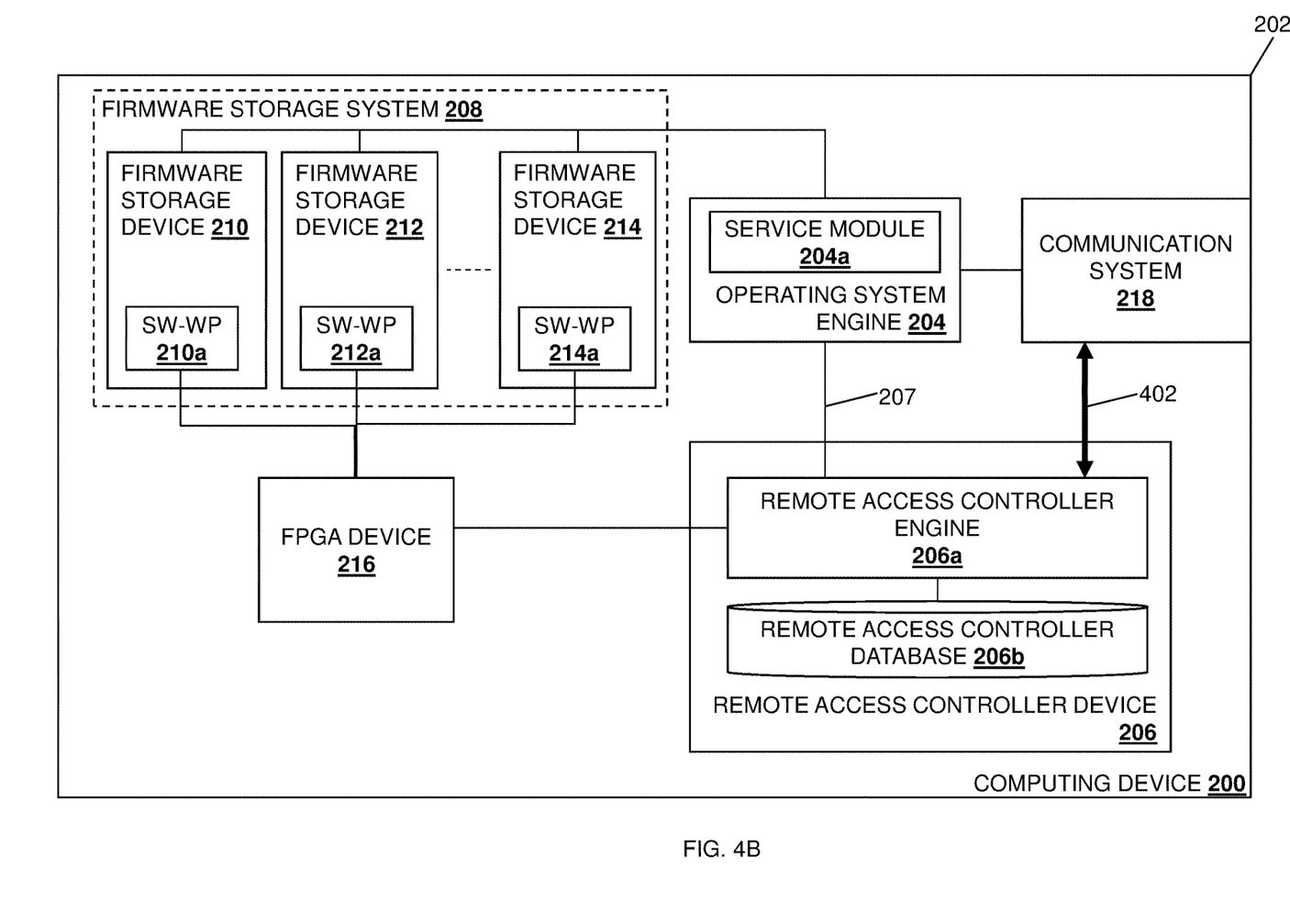
FIG. 4B is a schematic view illustrating an embodiment of the computing device operating during the method of FIG. 3.

The method 300 then proceeds to block 304 where the remote access controller device retrieves a firmware update package. With reference to FIG. 4B, in an embodiment of block 304, the remote access controller engine 206a in the remote access controller device 206 may perform firmware update package retrieval operations 402 via the communication system 218 that include retrieving a firmware update package. For example, the firmware update package retrieved at block 304 may be included in and/or provided by a computing device vendor update package (e.g., a DELL® Update Package (DUP) provided for server systems available from DELL EMC® discussed above), and may include a firmware update utility that is configured for use in updating firmware (discussed in further detail below), a firmware update image that provides the firmware update (discussed in further detail below), and/or any other computing device vendor update package elements that would be apparent to one of skill in the art in possession of the present disclosure.

Thus, in a specific example, the computing device vendor update package including/providing the firmware update package may be retrieved via the out-of-band management network by the remote access controller engine 206a (e.g., using conventional computing device vendor update package/DUP and/or computing device lifecycle controller techniques), the payload in that computing device vendor update package may be verified/validated, a firmware update package provided by and/or included in that computing device vendor update package may be identified, and that computing device vendor update package may be stored in the remote access controller database 206b (e.g., an iDRAC partition on an iDRAC storage device). However, while specific retrieval techniques for a particular firmware update package are described, one of skill in the art in possession of the present disclosure will appreciate how a variety of firmware update packages may be retrieved by the remote access controller device 206 in a variety of manners while remaining within the scope of the present disclosure.

While the method 300 illustrates and describes the firmware update package as being retrieved at block 304 following the receiving of the firmware update command at block 302, one of skill in the art in possession of the present disclosure will appreciate how the firmware update package may be retrieved at block 304 prior to the receiving of the firmware update command at block 302. For example, rather than retrieving the firmware update package in response to receiving the firmware update command, the remote access controller engine 206a in the remote access controller device 206 may retrieve or receive the firmware update package and store it in the remote access controller database 206b, and then may subsequently receive the firmware update command (as described above with reference to block 302) to perform a firmware update using that firmware update package. As such, while the method 300 illustrates and described a specific ordering of its blocks, one of skill in the art in possession of the present disclosure will appreciate how those blocks may be performed in a different order while remaining within the scope of the present disclosure as well.

Figure 4C:
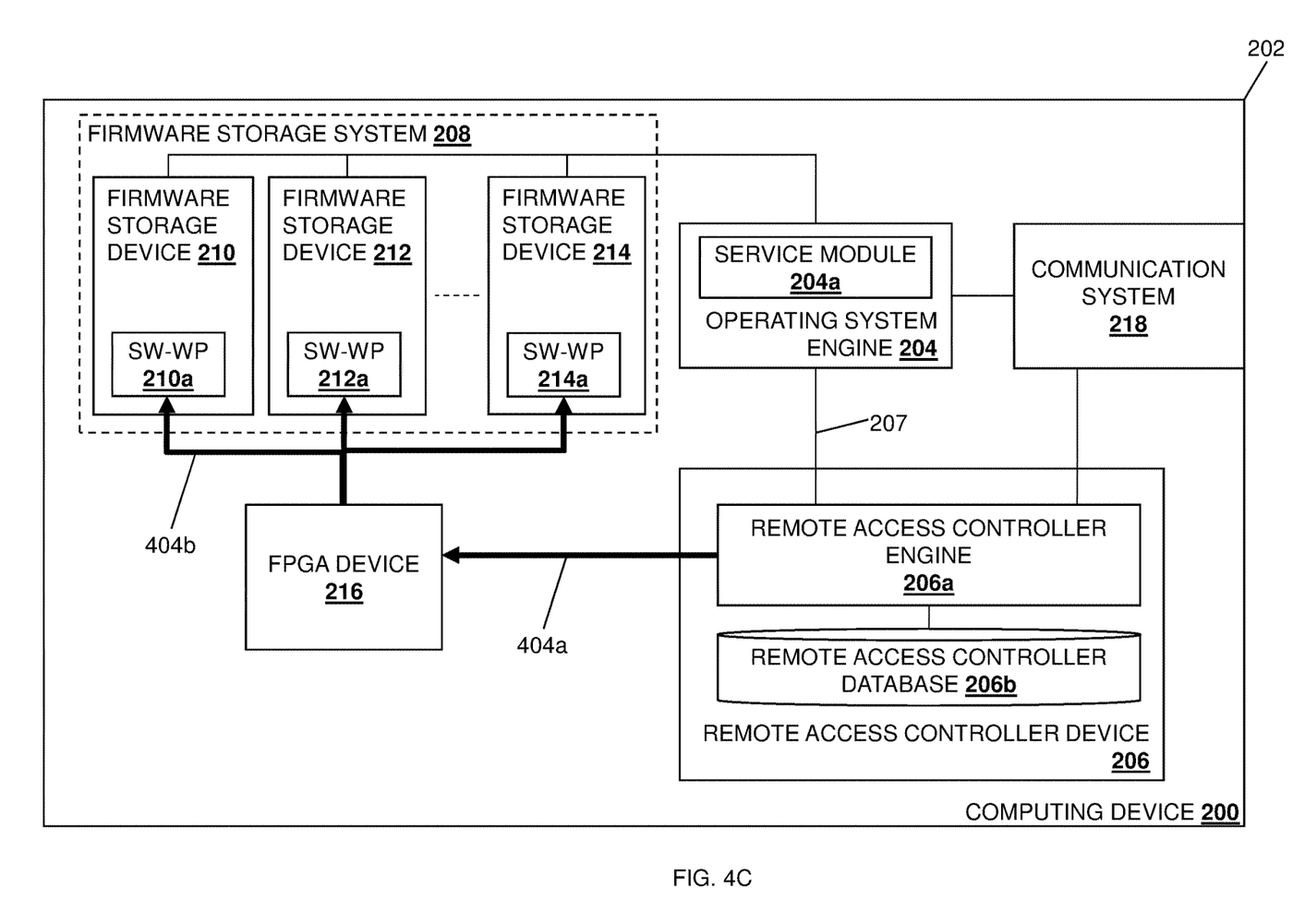
FIG. 4C is a schematic view illustrating an embodiment of the computing device operating during the method of FIG. 3.

The method 300 then proceeds to block 306 where the remote access controller device performs firmware storage unlock operations to unlock one or more firmware storage devices. As will be appreciated by one of skill in the art in possession of the present disclosure, the SW-WP elements 210a, 212a, and 214a may have previously been configured to enable write protection for the firmware storage devices 210, 212, and/or 214, respectively, in order "lock" those firmware storage devices 210-214 to prevent unauthorized changes to data stored thereon, as well as provide other security benefits known in the art. With reference to FIG. 4C, in an embodiment of block 306 and in response to receiving the single out-of-band firmware update command (with the firmware update package having been retrieved prior to or in response to that firmware update command), the remote access controller engine 206a in the remote access controller device 206 and the FPGA device 216 may perform unlocking command transmission operations 404a and 404b that include unlocking one or more of the firmware storage devices 210-214 in the firmware storage system 208.

In a specific example, the unlocking command transmission operations 404a may include the remote access controller engine 206a in the remote access controller device 206 generating and transmitting System Management Bus Post Box Interface (SMBPBI) unlocking command(s) to the FPGA device 216 for the firmware storage devices 210-214 that host the firmware being updated using the firmware update package. Furthermore, the unlocking command transmission operations 404b may include the FPGA device 216 transmitting write protection disable instruction(s) to the firmware storage devices 210-214 identified in the SMBPBI unlocking command(s), and one of skill in the art in possession of the present disclosure will appreciate how such write protection disable instructions may be executed on the SW-WP elements 210a, 212a, and/or 214a to disable any write protection that was previously enabled for those firmware storage devices 210, 212, and/or 214, respectively.

As will be appreciated by one of skill in the art in possession of the present disclosure, the firmware being updated using the firmware update package may only be hosted by a subset of the firmware storage devices 210-214 in the firmware storage system 208, and thus the remote access controller engine 206a in the remote access controller device 206 may identify that subset of the firmware storage devices 210-214 to ensure that the unlocking command transmission operations 404a and 404b only provide for the unlocking of those firmware storage devices 210-214. Thus, following block 306, the firmware storage devices 210-214 in the firmware storage system 208 that host the firmware being updated using the firmware update package with be unlocked such that firmware update writes and/or other firmware update operations may be performed on those firmware storage devices 210-214. In a specific example in which multiple GPUs are included in the computing device 200, different firmware storage devices 210-214 may host GPU firmware for each of those GPUs, and one or more of those firmware storage devices 210-214 may be unlocked to order to update that GPU firmware.

The method 300 then proceeds to block 308 where the remote access controller device transmits the firmware update package to an operating system engine. In the embodiments described herein, the method 300 includes the remote access controller device 206 transmitting the firmware update package to the operating system engine 204 in order to allow the operating system engine 204 to perform firmware update operations using the firmware update package, operations which one of skill in the art in possession of the present disclosure will appreciate may be required due to limitations with regard to the ability of the remote access controller device 206 to write to the firmware storage devices 210-214 in order to perform the firmware update operations. However, the inventors of the present disclosure envision that those issues may be resolved in the future such that the remote access controller device 206 will be capable of writing to the firmware storage devices 210-214 in order to perform the firmware update operations, and thus some embodiments of the method 300 may omit the transmission of the firmware update package from the remote access controller device 206 to the operating system engine 204.

Figure 4D:
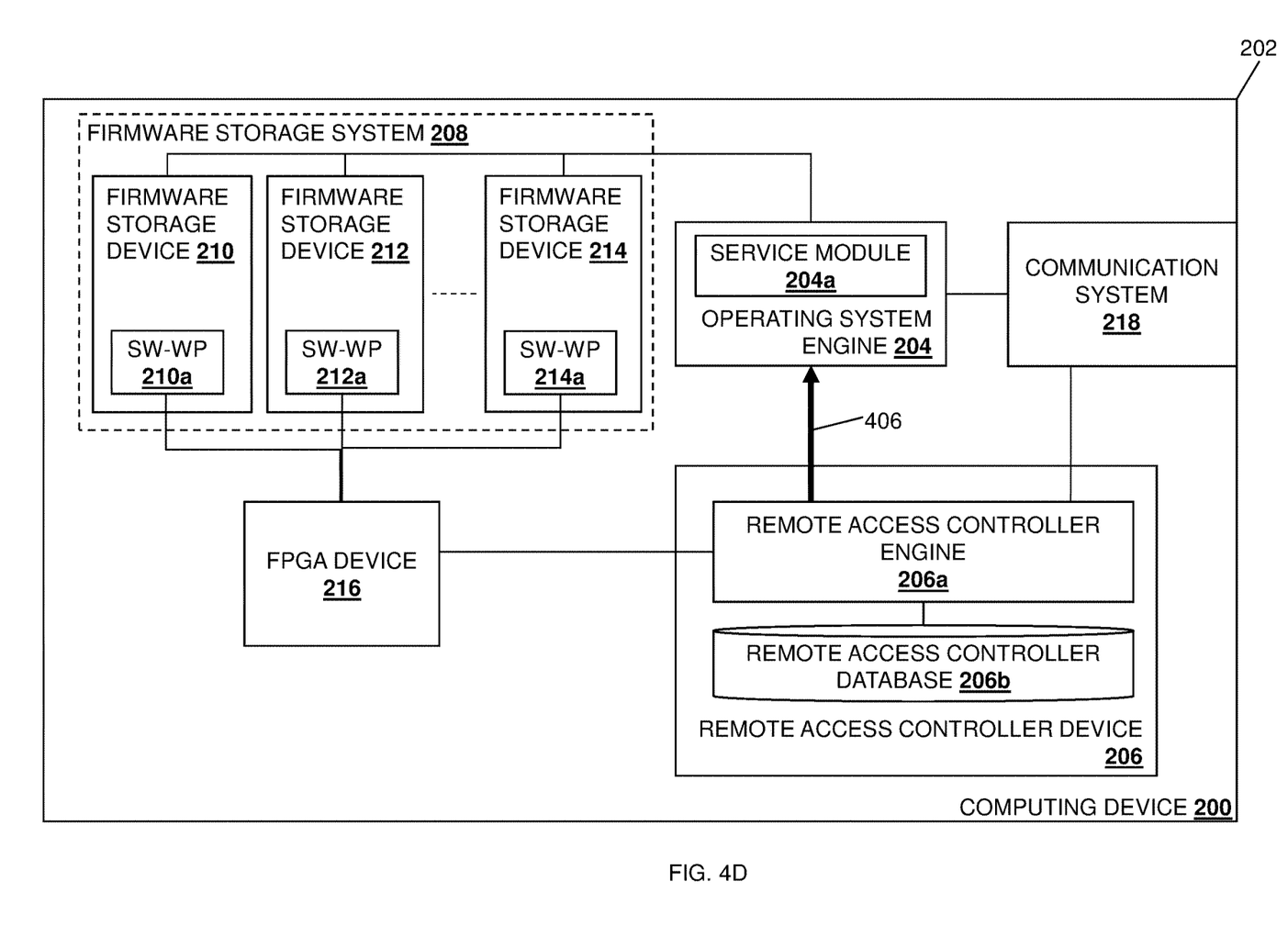
FIG. 4D is a schematic view illustrating an embodiment of the computing device operating during the method of FIG. 3.

However, with reference to FIG. 4D and in an embodiment of block 308, the remote access controller engine 206a in the remote access controller device 206 may perform firmware update package transmission operations 406 that include transmitting the firmware update package via the link 207 to the operating system engine 204. As such, continuing with the specific example discussed above, the firmware update package transmission operations 406 may include the remote access controller engine 206a in the remote access controller device 206 parsing the computing device vendor update package to retrieve the firmware update package, and transmitting the firmware update package via a USB/NIC passthrough interface and to the service module 204a (e.g., an iSM) included the operating system engine 204. As discussed above, the firmware update package transmitted to the operating system engine 204 may include the firmware update utility and the firmware update image(s) for the firmware being updated, as well as any other firmware update package elements that would be apparent to one of skill in the art in possession of the present disclosure.

Furthermore, in some embodiments, the unlocking command transmission operations 404a and 404b at block 306 and the firmware update package transmission operations 406 may be synchronized such that the updating of firmware using the firmware update package (discussed below) transmitted via the firmware update package transmission operations 406 occurs subsequent to the unlocking of the firmware storage device(s) 210-214 via the unlocking command transmission operations 404a and 404b. As such, in some embodiments, the firmware update package transmission operations 406 may be synchronized with the unlocking command transmission operations 404a and 404b such that they are performed after the unlocking command transmission operations 404a and 404b. However, in other embodiments, the firmware update package transmission operations 406 may be synchronized with the unlocking command transmission operations 404a and 404b such that they are performed before the unlocking command transmission operations 404a and 404b as long as the updating of firmware using the firmware update package transmitted via the firmware update package transmission operations 406 occurs subsequent to the unlocking of the firmware storage device(s) 210-214 via the unlocking command transmission operations 404a and 404b. As such, one of skill in the art in possession of the present disclosure will appreciate how the unlocking command transmission operations 404a and 404b at block 306 and the firmware update package transmission operations 406 may be synchronized in a variety of manners to enable the firmware update functionality discussed below.

Figure 4E:
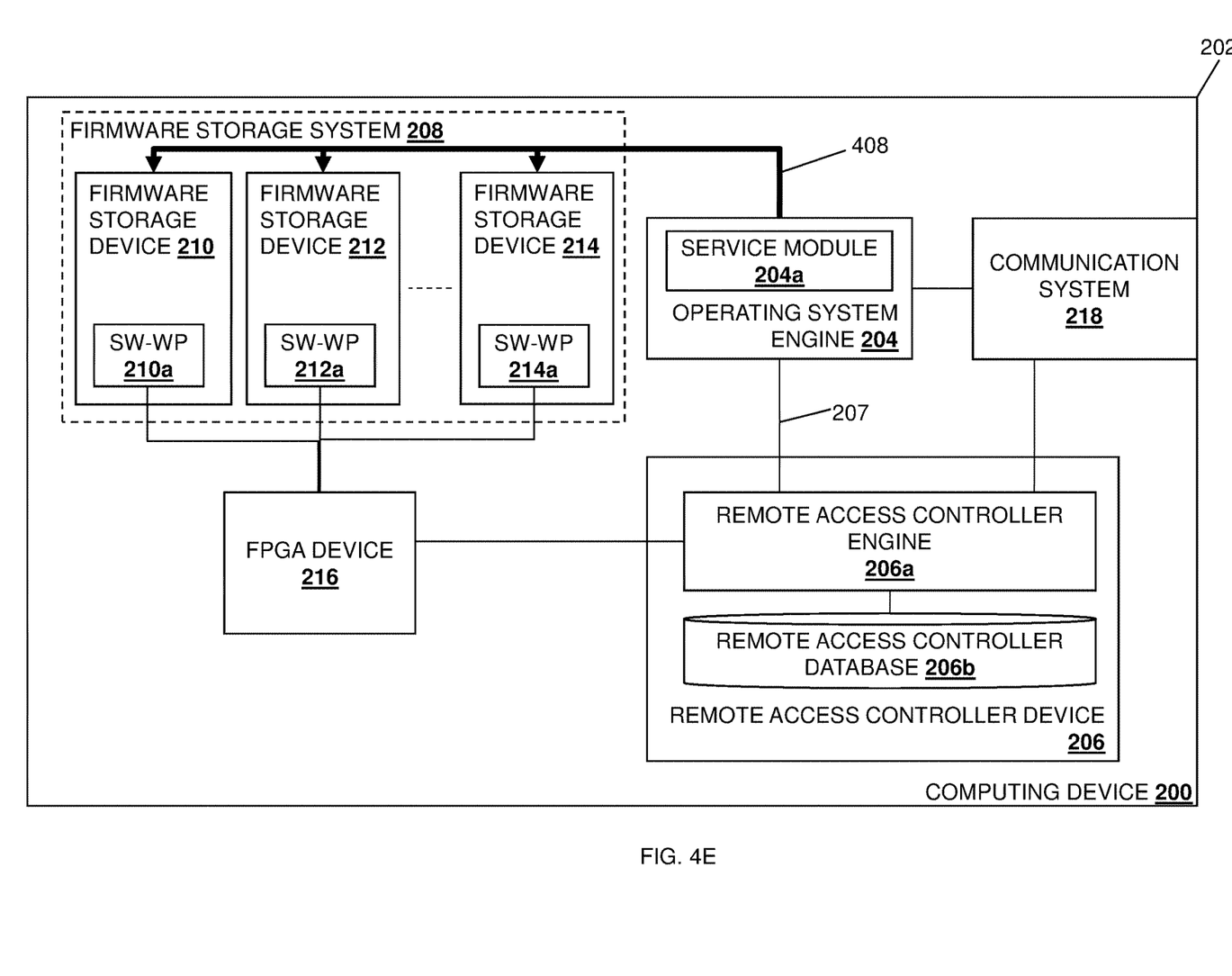
FIG. 4E is a schematic view illustrating an embodiment of the computing device operating during the method of FIG. 3.
Figure 4F:
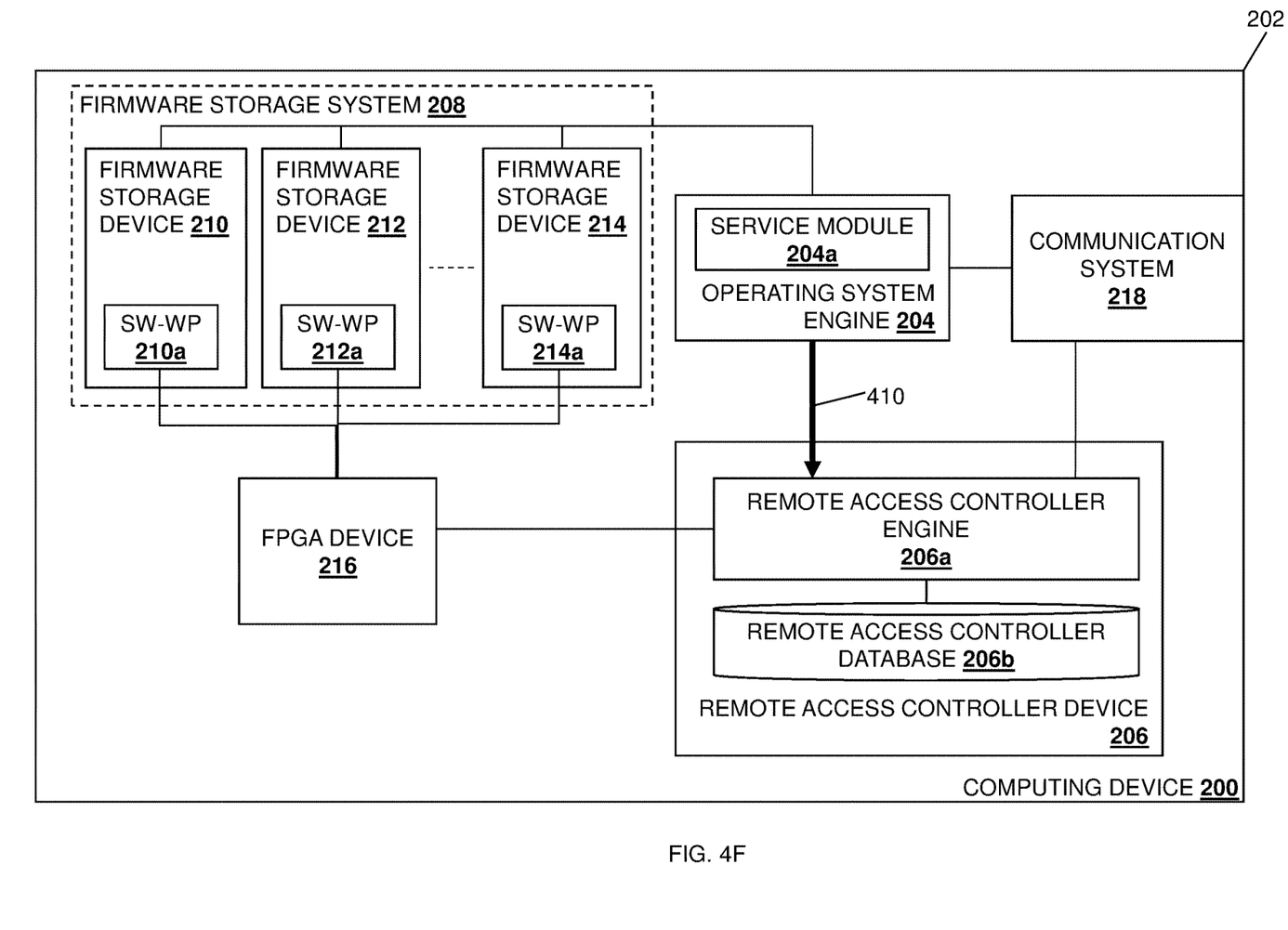
FIG. 4F is a schematic view illustrating an embodiment of the computing device operating during the method of FIG. 3.

The method 300 then proceeds to block 310 the operating system engine utilizes a firmware update utility in the firmware update package to update firmware stored on the firmware storage device(s) that were unlocked with a firmware update image in the firmware update package. With reference to FIG. 4E, in an embodiment of block 310, the operating system engine 204 may perform firmware update operations 408 that include using the firmware update package received from the remote access controller device 206 to update firmware hosted on the firmware storage device(s) 210-214. Continuing with the specific example provided above, the service module 204a (e.g., an iSM) in the operating system 204 may run the firmware update utility that was included in the firmware update package to update firmware (e.g., GPU firmware) hosted on the firmware storage device(s) 210-214 using the firmware update image(s) that were included in the firmware update package. As discussed above, the firmware update image(s) included in the firmware update package may provide for the updating of firmware stored on some subset of the firmware storage devices 210-214 (with that subset of firmware storage devices 210-214 having been unlocked at block 306), and thus at block 310 that subset of firmware storage devices 210-214 may be updated by the service module 204a (e.g., an iSM) in the operating system 204 via the running the firmware update utility that was included in the firmware update package and using those firmware update image(s). However, as discussed above, in situations in which the remote access controller device 206 is configured to write to the firmware storage devices 210-214, the remote access controller device 206 may perform the firmware update operations in place of the operating system engine 204.

The method 300 then proceeds to block 312 where the operating system engine transmits a firmware update completion message to the remote access controller device. With reference to FIG. 4E, in an embodiment of block 312, the operating system engine 204 may perform firmware update completion message transmission operations 410 that include transmitting a firmware update completion message via the link 207 to the remote access controller engine 206a in the remote access controller device 206. As such, continuing with the specific example discussed above, the firmware update completion message transmission operations 410 may include the service module 204a (e.g., an iSM) in the operating system engine 204 generating a firmware update completion message (e.g., an instruction to lock any unlocked firmware storage devices via the enablement of write protection in the specific examples discussed below), and transmitting the firmware update completion message via a USB/NIC passthrough interface and to the remote access controller engine 206a in the remote access controller device 206. However, while a specific firmware update completion message has been described, one of skill in the art in possession of the present disclosure will appreciate that the operating system engine 204 may indicate the completion of firmware update operations to the remote access controller device 206 in a variety of manners that will fall within the scope of the present disclosure as well. Furthermore, as discussed above, in situations in which the remote access controller device 206 is configured to write to the firmware storage devices 210-214, block 312 of the method 300 may be omitted.

Figure 4G:
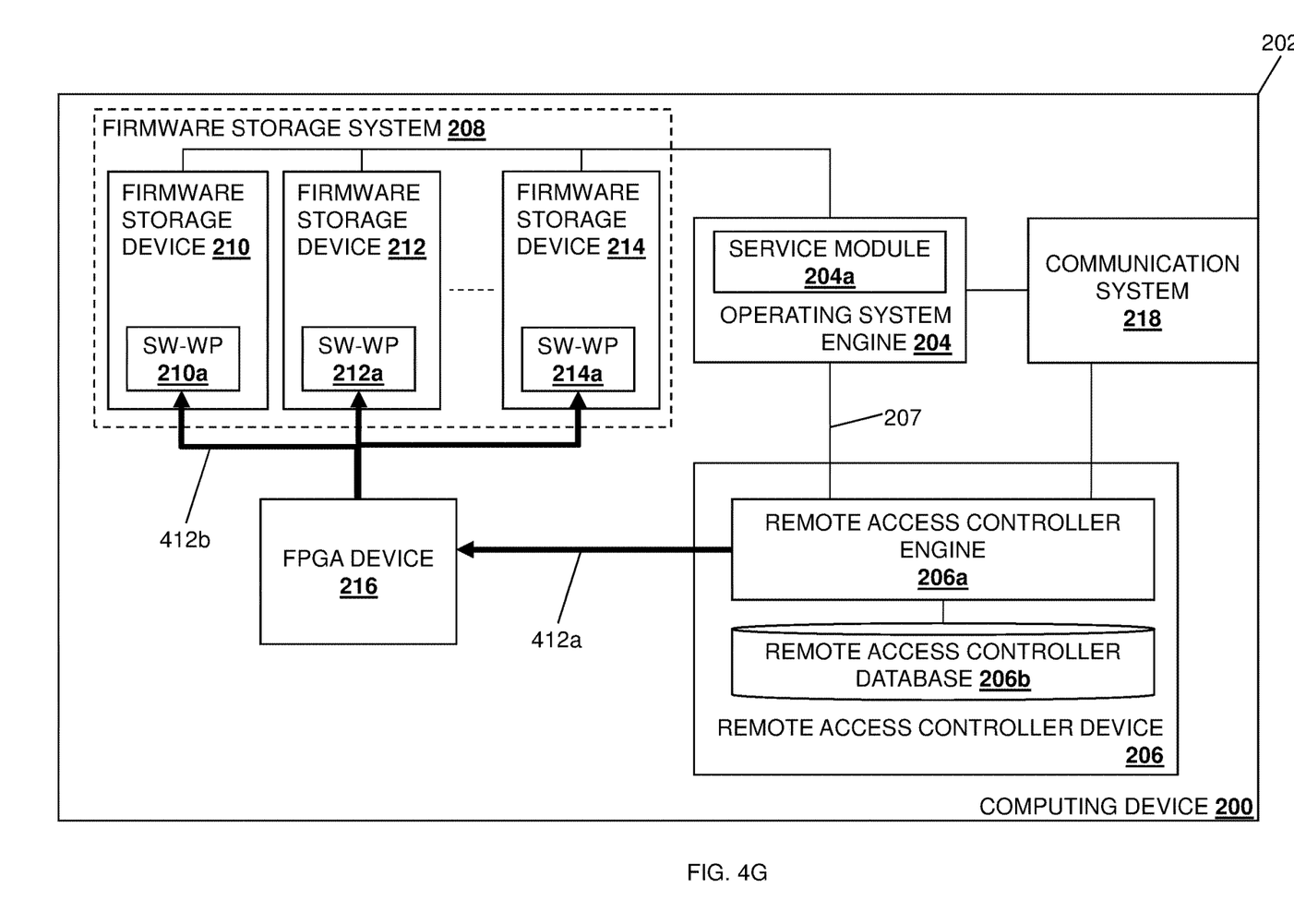
FIG. 4G is a schematic view illustrating an embodiment of the computing device operating during the method of FIG. 3.

The method 300 then proceeds to block 314 where the remote access controller device performs firmware storage lock operations to lock the firmware storage device(s). As will be appreciated by one of skill in the art in possession of the present disclosure, the disablement of write protection via the SW-WP elements 210a, 212a, and 214a for the firmware storage devices 210, 212, and/or 214, respectively, operates to "unlock" those firmware storage devices 210-214 and allow the updating of the firmware hosted thereon. With reference to FIG. 4G, in an embodiment of block 314 and in response to receiving the firmware update completion message from the operating system engine 204, the remote access controller engine 206a in the remote access controller device 206 and the FPGA device 216 may perform locking command transmission operations 412a and 412b that include locking one or more of the firmware storage devices 210-214 in the firmware storage system 208.

In a specific example, the locking command transmission operations 412a may include the remote access controller engine 206a in the remote access controller device 206 generating and transmitting System Management Bus Post Box Interface (SMBPBI) locking command(s) to the FPGA device 216 for the firmware storage devices 210-214 that were unlocked at block 306. Furthermore, the locking command transmission operations 412b may include the FPGA device 216 transmitting write protection enable instruction(s) to the firmware storage devices 210-214 that were unlocked at block 306 (e.g., as identified in the SMBPBI locking command(s), as identified by the remote access controller engine 206a, etc.), and one of skill in the art in possession of the present disclosure will appreciate how such write protection enable instructions may be executed on the SW-WP elements 210a, 212a, and/or 214a to enable any write protection that was previously disabled for those firmware storage devices 210, 212, and/or 214, respectively, at block 306.

As such, following block 314, any firmware updates provided in the firmware update package have been applied to the firmware stored on the firmware storage device(s) 210-214, and those firmware storage device(s) 210-214 have been locked, in response to the single out-of-band firmware update command received at the remote access control 206 from the administrator of the computing device 200. Furthermore, as will be appreciated by one of skill in the art in possession of the present disclosure, in the event that any portion of the firmware update functionality discussed below fails, the locking of the firmware storage device(s) 210-214 described above may be performed. For example, in the event the firmware update package is not successfully transmitted to the operating system engine 204, the firmware update operations are not successfully completed, and/or in response to any other firmware update process failure that would be apparent to one of skill in the art in possession of the present disclosure, the operating system engine 204 may transmit a firmware update process failure message (e.g., similar to the transmission of the firmware update completion message discussed above with reference to block 312) to the remote access controller device 206 in order to cause the remote access controller device 206 to lock the firmware storage device(s) 210-214 similarly as described above.

Furthermore, in some embodiments, the firmware update completion message transmission operations 410 at block 312, the locking command transmission operations 412a and 412b at block 314, and the firmware update operations 408 at block 310 may be synchronized such that the updating of firmware based on the firmware update operations 408 is completed prior to the locking of the firmware storage device(s) 210-214 via the locking command transmission operations 412a and 412b. As such, in some embodiments, the firmware update completion message transmission operations 410 may be synchronized with the firmware update operations 408 such that they are performed after the firmware update operations 408 have been completed, and the locking command transmission operations 412a and 412b may be synchronized with the firmware update completion message transmission operations 410 such that the locking commands are not transmitted until the firmware update completion message is received. However, in other embodiments, the firmware update completion message transmission operations 410 may be performed before the firmware update operations 408 have been completed, and/or the locking command transmission operations 412a and 412b may be transmitted before the firmware update completion message is received, as long as the locking of the firmware storage device(s) 210-214 via the locking command transmission operations 412a and 412b is performed subsequent to the updating of firmware via the firmware update operations 408. As such, one of skill in the art in possession of the present disclosure will appreciate how the firmware update completion message transmission operations 410 at block 312, the locking command transmission operations 412a and 412b at block 314, and the firmware update operations 408 at block 310 may be synchronized in a variety of manners to enable the firmware update functionality discussed below.

Thus, systems and methods have been described that provide for the updating of GPU firmware that is stored in a lockable firmware storage system via a single firmware update command from an administrator or other user of a server system. For example, the GPU firmware update system of the present disclosure may include firmware storage device(s), an operating system engine coupled to the firmware storage device(s), and a remote access controller device coupled to the firmware storage device(s) and the operating system engine. The remote access controller device receives a single out-of-band GPU firmware update command and, in response, performs a firmware storage device unlock operation to unlock the firmware storage device(s), transmits a GPU firmware update package including a GPU firmware update utility and a GPU firmware update image to the operating system engine to cause the operating system engine to utilize the GPU firmware update utility to update GPU firmware stored in the firmware storage device(s) that was unlocked with the GPU firmware update image and, subsequent to the operating system engine updating the GPU firmware stored in the at least one firmware storage device that was unlocked, performs a firmware storage device lock operation to lock the firmware storage device(s). As such, the need in conventional GPU firmware update systems to switch between different management interfaces multiple times to update GPU firmware is eliminated, streamlining the GPU firmware update process for the administrator of the server system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A firmware update system, comprising:
a computing device including:
at least one firmware storage device;
an operating system engine that is coupled to the at least one firmware storage device and that is configured to provide an operating system that operates following initialization of the computing device; and
a remote access controller device that is separate from the operating system engine and coupled to the operating system engine via a communication link, as well as coupled to the at least one firmware storage device, wherein the remote access controller device is configured to:
receive a single administrator-initiated out-of-band firmware update command and, in response to that single administrator-initiated out-of-band firmware update command and without receiving any subsequent administrator-initiated commands following that single administrator-initiated out-of-band firmware update command:
perform a firmware storage device unlock operation to unlock the at least one firmware storage device;
transmit a firmware update package including a firmware update utility and a firmware update image to the operating system via the communication link, wherein the operating system is configured, without receiving any administrator-initiated commands, to:
utilize the firmware update utility to update firmware stored in the at least one firmware storage device that was unlocked with the firmware update image; and
perform, subsequent to the operating system updating the firmware stored in the at least one firmware storage device that was unlocked, a firmware storage device lock operation to lock the at least one firmware storage device.

2. The system of claim 1, wherein the at least one firmware storage device is provided by at least one Electronically Erasable Programmable Read Only Memory (EEPROM) firmware storage device, or at least one Serial Peripheral Interconnect (SPI) firmware storage device.

3. The system of claim 1, wherein the remote access controller device is coupled to the operating system engine via a Universal Serial Bus (USB)/Network Interface Controller (NIC) passthrough interface that provides the communication link, and wherein the remote access controller device is configured to transmit the firmware update package to the operating system via the USB/NIC passthrough interface.

4. The system of claim 1, further comprising:
a Graphics Processing Unit (GPU) that is coupled to the at least one firmware storage device and that is configured to utilize the firmware stored on the at least one firmware storage device.

5. The system of claim 1, wherein the remote access controller device is configured to:
receive, from the operating system via the communication link subsequent to the operating system updating the firmware stored in the at least one firmware storage device that was unlocked, a firmware update completion message, wherein the remote access controller device is configured to perform the firmware storage device lock operation in response to receiving the firmware update completion message.

6. The system of claim 1, wherein the remote access controller device is configured to:
retrieve, via a network and in response to receiving the single administrator-initiated out-of-band firmware update command and without receiving any subsequent administrator-initiated commands following that single administrator-initiated out-of-band firmware update command, the firmware update package.

7. The system of claim 1, further comprising:
a Field Programmable Gate Array (FPGA) device coupling the remote access controller device to the at least one firmware storage device, wherein the remote access controller device performs the firmware storage device unlock operation and the firmware storage device lock operation via the FPGA device.

8. An Information Handling System (IHS), comprising:
a processing system; and
a memory system that is coupled to the processing system and that includes instructions that, when executed by the processing system, cause the processing system to provide a remote access controller engine that is configured, following initialization of a computing device such that an operating system engine in the computing device that is separate from the remote access controller engine and coupled to the remote access controller engine via a communication link provides an operating system, to:
receive a single administrator-initiated out-of-band firmware update command and, in response to that single administrator-initiated out-of-band firmware update command and without receiving any subsequent administrator-initiated commands following that single administrator-initiated out-of-band firmware update command:
perform a firmware storage device unlock operation to unlock at least one firmware storage device that is included in the computing device;
transmit a firmware update package including a firmware update utility and a firmware update image to the operating system via the communication link, wherein the firmware update package is configured to cause the operating system to utilize, without receiving any administrator-initiated commands, the firmware update utility to update firmware stored in the at least one firmware storage device that was unlocked with the firmware update image; and
perform, subsequent to the operating system updating the firmware stored in the at least one firmware storage device that was unlocked, a firmware storage device lock operation to lock the at least one firmware storage device.

9. The IHS of claim 8, wherein the at least one firmware storage device is provided by at least one Electronically Erasable Programmable Read Only Memory (EEPROM) firmware storage device, or at least one Serial Peripheral Interconnect (SPI) firmware storage device.

10. The IHS of claim 8, wherein the remote access controller engine is coupled to the operating system engine via a Universal Serial Bus (USB)/Network Interface Controller (NIC) passthrough interface that provides the communication link, and wherein the remote access controller engine is configured to transmit the firmware update package to the operating system via the USB/NIC passthrough interface.

11. The IHS of claim 8, wherein the firmware stored in the at least one firmware storage device is Graphics Processing Unit (GPU) firmware, and wherein the firmware update image is a GPU firmware update image.

12. The IHS of claim 8, wherein the remote access controller engine is configured to:
receive, from the operating system via the communication link subsequent to the operating system engine updating the firmware stored in the at least one firmware storage device that was unlocked, a firmware update completion message, wherein the remote access controller engine is configured to perform the firmware storage device lock operation in response to receiving the firmware update completion message.

13. The IHS of claim 8, wherein the remote access controller engine is configured to:
retrieve, via a network and in response to receiving the single administrator-initiated out-of-band firmware update command and without receiving any subsequent administrator-initiated commands following that single administrator-initiated out-of-band firmware update command, the firmware update package.

14. A method for updating firmware, comprising:
receiving, by a remote access controller device following initialization of a computing device such that an operating system engine in the computing device that is separate from the remote access controller device and coupled to the remote access controller device via a communication link provides an operating system, a single administrator-initiated out-of-band firmware update command and, in response to that single administrator-initiated out-of-band firmware update command and without receiving any subsequent administrator-initiated commands following that single administrator-initiated out-of-band firmware update command:
performing, by the remote access controller device, a firmware storage device unlock operation to unlock at least one firmware storage device that is included in the computing device;
transmitting, by the remote access controller device, a firmware update package including a firmware update utility and a firmware update image to the operating system via the communication link, wherein the firmware update package is configured to cause the operating system engine to utilize, without receiving any administrator-initiated commands, the firmware update utility to update firmware stored in the at least one firmware storage device that was unlocked with the firmware update image; and
performing, by the remote access controller device subsequent to the operating system updating the firmware stored in the at least one firmware storage device that was unlocked, a firmware storage device lock operation to lock the at least one firmware storage device.

15. The method of claim 14, wherein the at least one firmware storage device is provided by at least one Electronically Erasable Programmable Read Only Memory (EEPROM) firmware storage device, or at least one Serial Peripheral Interconnect (SPI) firmware storage device.

16. The method of claim 14, wherein the remote access controller device is coupled to the operating system engine via a Universal Serial Bus (USB)/Network Interface Controller (NIC) passthrough interface that provides the communication link, and wherein the remote access controller device transmits the firmware update package to the operating system via the USB/NIC passthrough interface.

17. The method of claim 14, wherein the firmware stored in the at least one firmware storage device is Graphics Processing Unit (GPU) firmware, and wherein the firmware update image is a GPU firmware update image.

18. The method of claim 14, further comprising:
receiving, by the remote access controller device from the operating system via the communication link subsequent to the operating system engine updating the firmware stored in the at least one firmware storage device that was unlocked, a firmware update completion message, wherein the remote access controller device performs the firmware storage device lock operation in response to receiving the firmware update completion message.

19. The method of claim 14, further comprising:
retrieving, by the remote access controller device via a network and in response to receiving the single administrator-initiated out-of-band firmware update command and without receiving any subsequent administrator-initiated commands following that single administrator-initiated out-of-band firmware update command, the firmware update package.

20. The method of claim 14, wherein the remote access controller device performs the firmware storage device unlock operation and the firmware storage device lock operation via a Field Programmable Gate Array (FPGA) device that couples the remote access controller device to the at least one firmware storage device.

* * * * *